United States Patent
Hsiong et al.

(10) Patent No.: US 8,397,200 B2
(45) Date of Patent: Mar. 12, 2013

(54) EFFICIENT CONTINUOUS GRADING FLOW FOR TEST COVERAGE ANALYSIS

(75) Inventors: Christopher E. Hsiong, Santa Clara, CA (US); Lloyd C. Cha, Saratoga, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 120 days.

(21) Appl. No.: 12/825,850

(22) Filed: Jun. 29, 2010

(65) Prior Publication Data
US 2011/0320993 A1  Dec. 29, 2011

(51) Int. Cl.
*G06F 11/22*  (2006.01)
*G06F 17/50*  (2006.01)
(52) U.S. Cl. ......................... 716/136; 324/500
(58) Field of Classification Search ................. 716/136; 324/500
See application file for complete search history.

(56) References Cited

U.S. PATENT DOCUMENTS 7,114,111 B2 *  9/2006  Noy ............................... 714/738

OTHER PUBLICATIONS

L. Drucker, Functional Coverage Metrics—The Next Frontier, EE Times, Aug. 8, 2002 http://www.eetimes.com/showArticle.jhtml?articleID=16505534.
Synopsys, VCS/VCS MX Coverage Metrics User Guide, Version D-2009, Dec. 12, 2009.
Synopsys, URG, Unified Coverage Reporting User Guide, Version D-2009. Dec. 12, 2009.

* cited by examiner

*Primary Examiner* — Jack Chiang
*Assistant Examiner* — Brian Ngo
(74) *Attorney, Agent, or Firm* — Hamilton & Terrile, LLP; Stephen A. Terrile

(57) ABSTRACT

A system for performing efficient continuous grading flow for test coverage analysis. The system provides for continuous test coverage grading. The continuous grading flow analyzes individual tests upon completion without requiring an entire set of tests to finish. As a result, the grading process at the end of the regression run is no longer necessary, disk space and memory requirements are dramatically reduced, and partial results are produced as the grading of individual tests complete, allowing engineers to track progress and make real-time decisions based on the intermediate results. The resource requirements of our continuous flow scale linearly with the number of tests rather than exponentially as with traditional approaches.

12 Claims, 3 Drawing Sheets

EFFICIENT CONTINUOUS GRADING FLOW FOR TEST COVERAGE ANALYSIS

BACKGROUND OF THE INVENTION

1. Field of the Invention

The present invention relates to verification of integrated circuits, and more particularly to performing efficient continuous grading flow for test coverage analysis.

2. Description of the Related Art

Verification of complex integrated circuit chips such as microprocessors often requires large sets of tests to be executed to verify the quality of a design-under-test (DUT). To use compute resources efficiently, it is important to select the set of tests that most efficiently verifies the entire design. Functional coverage metrics are used to measure how well a test verifies the DUT. To determine the most efficient set of tests, test grading, a process that compares a test coverage footprint of each test, is performed.

Running and grading a large set of tests can be expensive. Many hours of computation are often required for both the simulation and grading steps. The grading process itself can require a large amount of disk space and memory. The resources required to grade a set of tests increase exponentially with respect to the number of tests being graded.

For example with certain complex integrated circuit designs, a weekly regression run can include tens of thousands of tests. These tests vary in length and complexity, taking anywhere from a few hours to a few days to run. Additional tests are added to the run during project development as features are added and new requirements are defined. Running the entire set of tests to qualify every change can be expensive and time consuming.

To reduce the time to qualify localized changes, it is known to run a subset of the entire regression run. Test grading is the process of identifying a subset of tests that best covers the DUT as measured by the coverage metrics. Known methods for grading tests can require waiting for all tests in a regression run to completion, followed by a relatively slow and memory intensive process of grading the entire set of tests at once. Results are not available until the entire process has completed, and all of the test data has to be retained during the entire procedure. With known methods for regression testing, the entire set of regression tests is executed to completion, collecting the coverage data from all tests. Additionally, with a procedure that is sometimes referred to as greedy grading, the coverage result for each test is compared with the results from every other test in the set to determine what parts of the design are uniquely covered by a particular test.

Another known approach is to perform another grading technique referred to as quick grading, which works by grading each incoming test relative to the aggregate coverage of all the previously graded tests in some pre-determined order. This approach is significantly faster than greedy grading, but can only provide equally accurate results if the tests that provide the most unique coverage are graded first. However, it is extremely difficult to determine a proper order without running greedy grading.

SUMMARY OF EMBODIMENTS OF THE INVENTION

In accordance with the present invention, a system for performing efficient continuous grading flow for test coverage analysis is set forth. The system provides for continuous test coverage grading. The continuous grading flow analyzes individual tests upon completion without requiring an entire set of tests to finish. As a result, the grading process at the end of the regression run is no longer necessary, disk space and memory requirements are dramatically reduced, and partial results are produced as the grading of individual tests complete, allowing progress to be tracked and decisions to be based on the intermediate results. The resource requirements of our continuous flow scale linearly with the number of tests rather than exponentially as with traditional approaches.

More specifically, in one embodiment, the invention relates to a method for performing efficient continuous grading flow for test coverage analysis. The method includes dividing a plurality of tests into groups; grading tests within a respective group; and, analyzing tests within the respective group upon completing grading of tests within the respective group, the analyzing being performed regardless of whether other tests in other groups have completed execution.

In another embodiment, the invention relates to a system comprising a processor and memory coupled to the processor. The memory stores a system for performing efficient continuous grading flow for test coverage analysis. The system includes instructions executable by the processor for: dividing a plurality of tests into groups; grading tests within a respective group; and, analyzing tests within the respective group upon completing grading of tests within the respective group, the analyzing being performed regardless of whether other tests in other groups have completed execution.

In another embodiment, the invention relates to a computer-readable medium embodying computer program code. The computer program code includes instructions executable by a processor for: dividing a plurality of tests into groups; grading tests within a respective group; and, analyzing tests within the respective group upon completing grading of tests within the respective group, the analyzing being performed regardless of whether other tests in other groups have completed execution.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
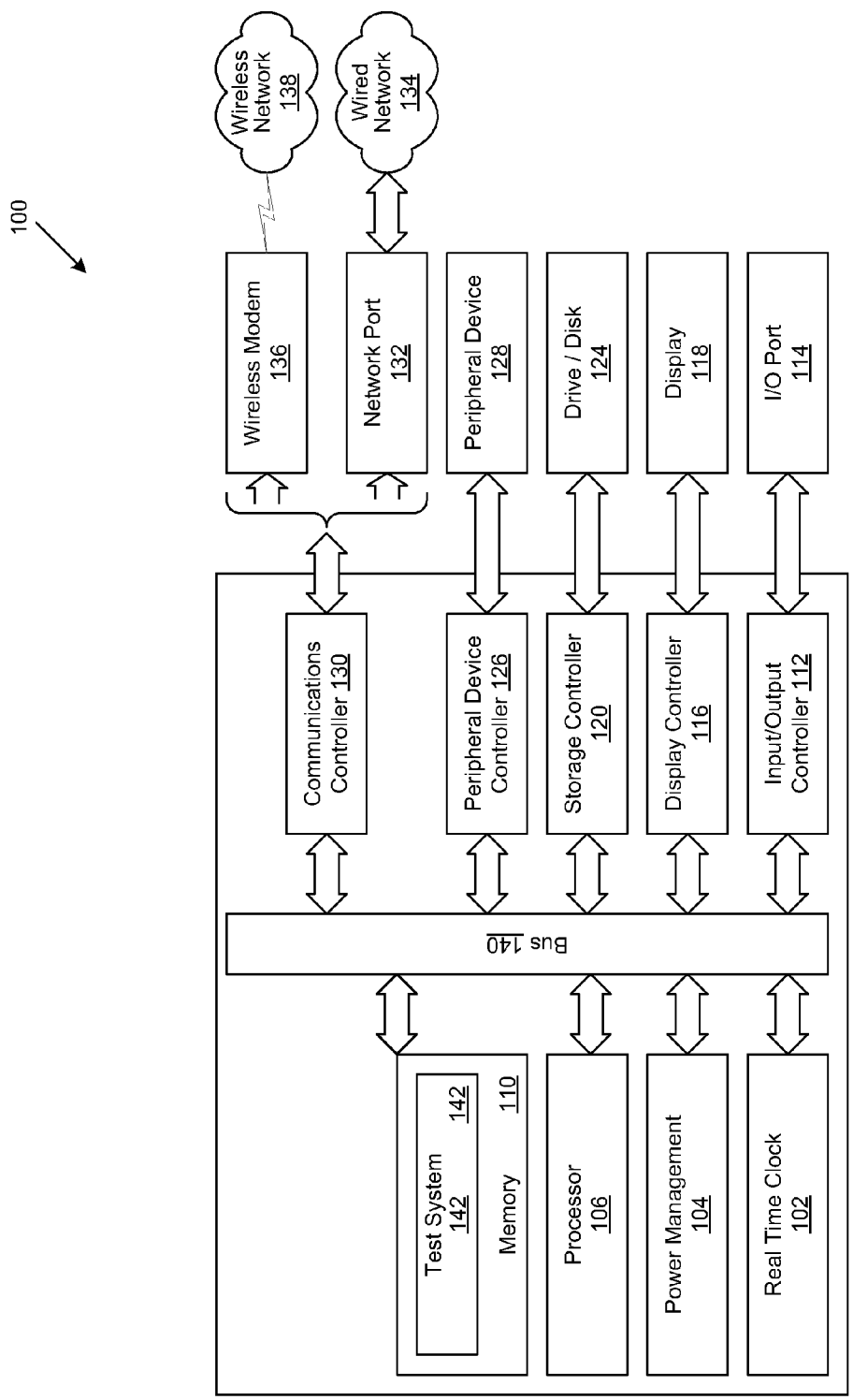
FIG. 1 shows a generalized block diagram of an information processing system as implemented in accordance with an embodiment of the invention.

FIG. 1 is a generalized block diagram illustrating an information processing system 100 as implemented in accordance with an embodiment of the invention. System 100 comprises a real-time clock 102, a power management module 104, a processor 106 and memory 110, all physically coupled via bus 140. In various embodiments, memory 110 comprises volatile random access memory (RAM), non-volatile read-only memory (ROM), non-volatile flash memory, or any combination thereof. In one embodiment, memory 110 also comprises test system 142.

Also physically coupled to bus 140 is an input/out (I/O) controller 112, further coupled to a plurality of I/O ports 114. In different embodiments, I/O port 114 may comprise a keyboard port, a mouse port, a parallel communications port, an RS-232 serial communications port, a gaming port, a universal serial bus (USB) port, an IEEE1394 (Firewire) port, or any combination thereof. Display controller 116 is likewise physically coupled to bus 140 and further coupled to display 118. In one embodiment, display 118 is separately coupled, such as a stand-alone, flat panel video monitor. In another embodiment, display 118 is directly coupled, such as a laptop computer screen, a tablet PC screen, or the screen of a personal digital assistant (PDA). Likewise physically coupled to bus 140 is storage controller 120 which is further coupled to mass storage devices such as a tape drive or hard disk 124. Peripheral device controller is also physically coupled to bus 140 and further coupled to peripheral device 128, such as a random array of independent disk (RAID) array or a storage area network (SAN).

In one embodiment, communications controller 130 is physically coupled to bus 140 and is further coupled to network port 132, which in turn couples the information processing system 100 to one or more physical networks 134, such as a local area network (LAN) based on the Ethernet standard. In other embodiments, network port 132 may comprise a digital subscriber line (DSL) modem, cable modem, or other broadband communications system operable to connect the information processing system 100 to network 134. In these embodiments, network 134 may comprise the public switched telephone network (PSTN), the public Internet, a corporate intranet, a virtual private network (VPN), or any combination of telecommunication technologies and protocols operable to establish a network connection for the exchange of information.

In another embodiment, communications controller 130 is likewise physically coupled to bus 140 and is further coupled to wireless modem 136, which in turn couples the information processing system 100 to one or more wireless networks 138. In one embodiment, wireless network 138 comprises a personal area network (PAN), based on technologies such as Bluetooth or Ultra Wideband (UWB). In another embodiment, wireless network 138 comprises a wireless local area network (WLAN), based on variations of the IEEE 802.11 specification, often referred to as WiFi. In yet another embodiment, wireless network 138 comprises a wireless wide area network (WWAN) based on an industry standard including two and a half generation (2.5G) wireless technologies such as global system for mobile communications (GPRS) and enhanced data rates for GSM evolution (EDGE). In other embodiments, wireless network 138 comprises WWANs based on existing third generation (3G) wireless technologies including universal mobile telecommunications system (UMTS) and wideband code division multiple access (W-CDMA). Other embodiments also comprise the implementation of other 3G technologies, including evolution-data optimized (EVDO), IEEE 802.16 (WiMAX), wireless broadband (WiBro), high-speed downlink packet access (HSDPA), high-speed uplink packet access (HSUPA), and emerging fourth generation (4G) wireless technologies.

Figure 2:
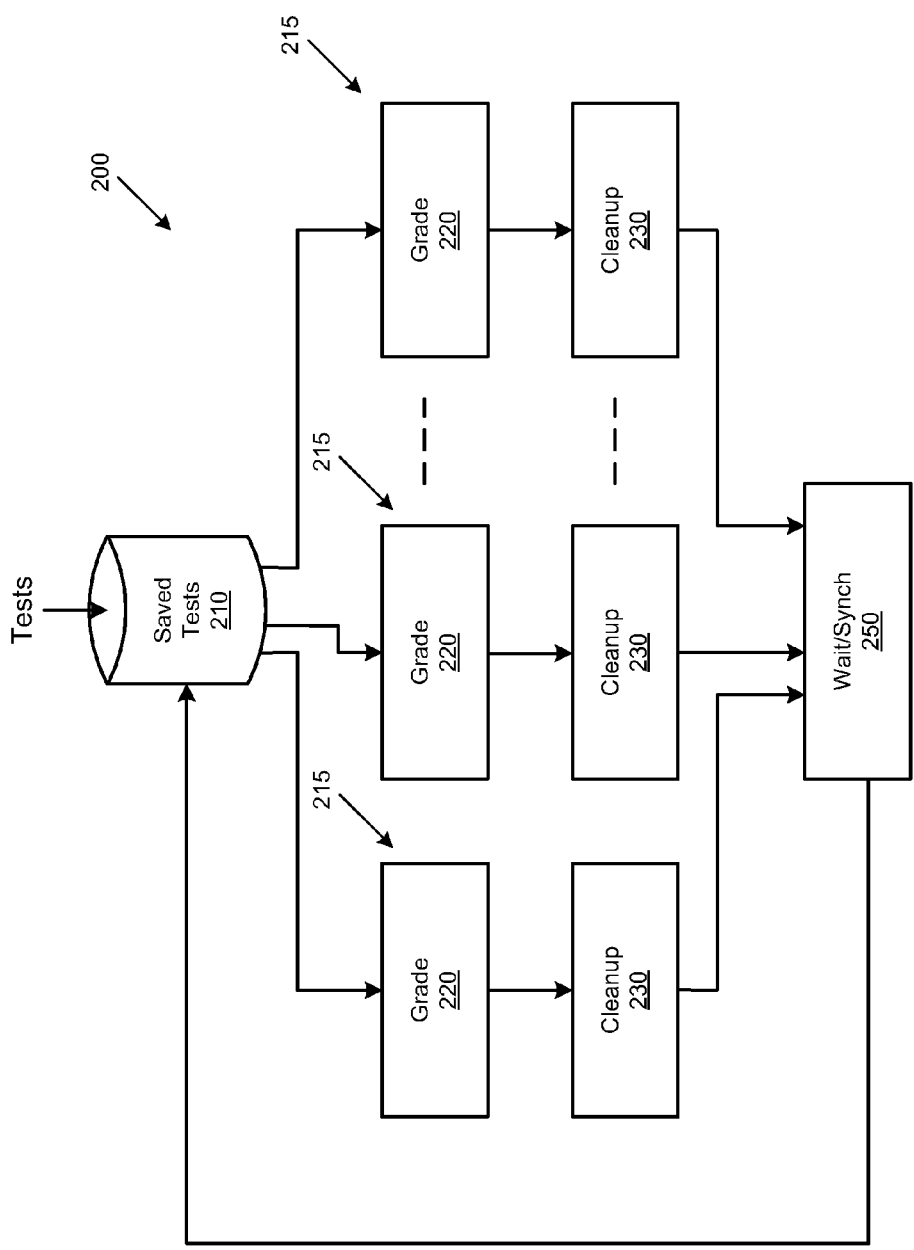
FIG. 2 shows a block diagram of a system for performing efficient continuous grading flow for test coverage analysis as implemented in accordance with an embodiment of the invention.

Referring to FIG. 2, a block diagram of a system 200 for performing efficient continuous grading flow for test coverage analysis as implemented in accordance with an embodiment of the invention is shown. In certain embodiments, the system 200 is included within the test system 100. The system 200 includes a memory 210 storing saved tests. The system also includes a plurality of parallel test coverage analysis modules 215. Each of the plurality of parallel test coverage analysis modules includes a grading module 220 and a cleanup module 230. Outputs from the plurality of parallel test coverage analysis module 215 are provided to a synchronization module 250

The system 200 takes an automated iterative approach to grading tests combined with dividing grading into manageable portions. In the context of the present invention, a manageable portion is defined as a number of tests that a given system can grade in a given amount of time using given performance resources or other constraints. So for example, with a test system having a particular performance, the manageable portion may be 200 tests because 200 tests can be graded by a particular system within a day.

Instead of waiting for an entire regression run to complete, the system starts the grading process as soon as a relatively small number of tests (e.g., a few hundred tests compared to a complete regression run of thousands to tens of thousands of tests) complete and coverage results are available. A manageable number of randomly accessed saved tests are provided to one of the grading modules 220.

The grading module 220 performs a grading operation for each test within the group of tests. The grading operation ranks the tests within the group of tests based upon how much coverage a particular test provides for a particular design. Coverage indicates how well a particular test exercises a certain amount of code of a particular design. Thus, the grading operation provides an indication of how well a particular test verifies a particular design compared with other tests within the group. In certain embodiments, the grading module 220 performs a greedy grading operation on the tests that are provided to the grading module. By performing a greedy grading operation, the grading module 220 takes into account which parts of the tests provided to the respective grading module 220 overlap.

The cleanup module 230 analyzes the results of the grading operation and removes tests from the group which do not meet certain criteria. For example, in one embodiment, the cleanup module 230 receives a ranked list of tests (which ranking is based upon greedy grading metrics) and discards a certain number of the lowest ranked tests (e.g., the cleanup module 230 may discard the lowest 20%). In another embodiment, the cleanup module 230 analyzes the coverage provided by each of the tests within the group and discards any tests which do not increase the overall coverage by certain amount (e.g., by more than 2%.).

The synchronization module 250 receives the cleaned up results from each of the plurality of parallel test coverage analysis modules 215 and holds these results until each of the groups has provided its respective result. Thus, the synchronization module 250 allows the system 200 to avoid a race condition where a particular group 215 moves on to another iteration before another group has finished its grading and cleanup procedures. In one embodiment, the synchronization module 250 holds the cleaned up results while the test memory 210 accumulates additional tests until a manageable number of tests are accumulated. This group of tests is then provided to a particular grading module 220. In another embodiment, the synchronization module 250 returns the tests provided by the respective groups 215 back to the saved test memory 210, which has also been accumulating more tests while the plurality of parallel test coverage analysis modules 215 were performing their grading and cleanup. The process then repeats.

Figure 3:
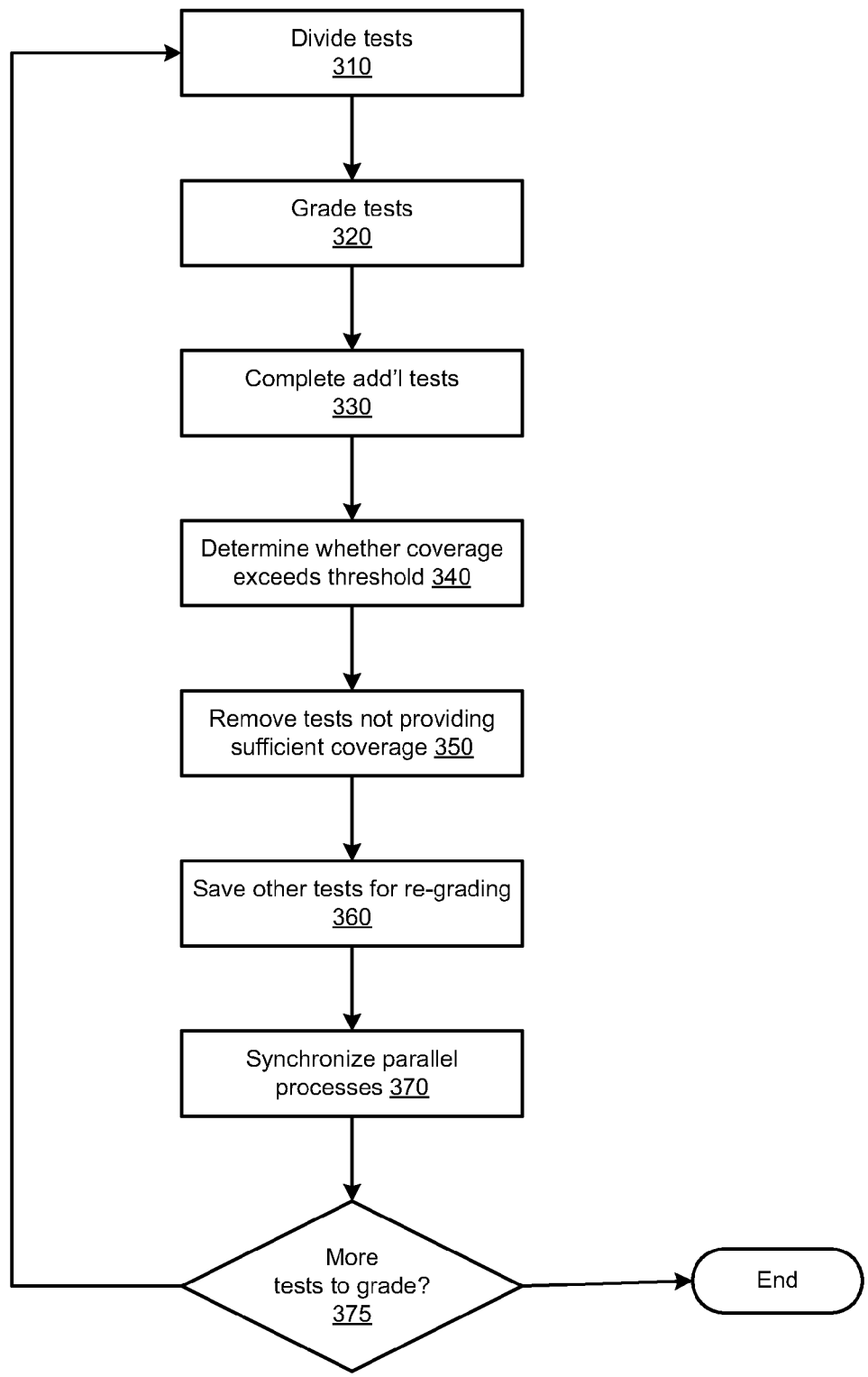
FIG. 3 shows a flow chart of the operation of a system for performing efficient continuous grading flow for test coverage analysis as implemented in accordance with an embodiment of the invention.

FIG. 3 shows a flow chart of the operation of a system 200 for performing efficient continuous grading flow for test coverage analysis as implemented in accordance with an embodiment of the invention.

More specifically, at step 310, the system 200 divides accumulated tests into a few groups (e.g., 10-20 groups) of several hundred tests which are each graded among themselves at step 320. The actual number of tests processed per iteration may be tuned based on needs of a project as well as processing resources that are available. The independent grading processes execute in parallel. In certain embodiments, the independent grading processes may take 16 to 24 hours to complete. During the time that the independent grading processes are executing, more tests will be completed and accumulated at step 330, so new tests will be available to grade when a next iteration of the grading processes begins. After each grading process is completed, the system determines whether the incremental coverage added by a particular test exceeds a given threshold at step 340.

Tests that do not add enough coverage to meet this criterion are removed from the next iteration of the grading process at step 350. Otherwise, the system saves the test so that the test can be re-graded with new incoming tests at step 360. This system then synchronizes all parallel processes at step 370, determines whether there are any new tests to grade at step 375 and repeats automatically until there are no more new tests to grade. Once the regression run has ended and there are no more new tests to grade, the system obtains the subset of tests that provides the most complete coverage for the DUT.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

It should be understood that at least some aspects of the present invention may alternatively be implemented in a computer-useable medium that contains a program product. Further, it is understood that the present invention may be implemented by a system having means in the form of hardware, software, or a combination of software and hardware as described herein or their equivalent.

For example, while in certain embodiments, the synchronization module 250 is used to avoid race conditions, it will be appreciated that other ways of avoiding race conditions are also contemplated. For example, a race condition can be avoided by using locks and/or semaphores.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for performing efficient continuous grading flow for test coverage analysis comprising:
    dividing, via an information processing system, a plurality of tests into groups;
    grading, via the information processing system, tests within a respective group; and,
    analyzing, via the information processing system, tests within the respective group upon completing grading of tests within the respective group, the analyzing being performed regardless of whether other tests in other groups have completed execution; wherein
    grading tests provides a grading value, the grading value providing an indication of how well a particular test verifies a particular design; and
    wherein the grading value comprises a metric that indicates how much coverage a particular test provides for a particular design, the coverage indicating how well a particular test exercises a certain amount of code of the particular design.

2. The method of claim 1, wherein
the grading comprises a greedy grading operation.

3. The method of claim 1, wherein
the results of the grading are analyzed and tests which do not meet predefined criteria are removed to provide a graded group of tests.

4. The method of claim 3, further comprising
holding the graded group of tests from a respective group until each of the groups has provided respective groups of tests; and,
combining the tests provided by the respective groups with additional tests; and, iteratively repeating the dividing, grading, analyzing and holding.

5. A system comprising:
    a processor;
    memory coupled to the processor, the memory storing a system for performing efficient continuous grading flow for test coverage analysis, the system comprising instructions executable by the processor for:
        dividing a plurality of tests into groups;
        grading tests within a respective group; and,
        analyzing tests within the respective group upon completing grading of tests within the respective group, the analyzing being performed regardless of whether other tests in other groups have completed execution; wherein
    grading tests provides a grading value, the grading value providing an indication of how well a particular test verifies a particular design; and
    wherein the grading value comprises a metric that indicates how much coverage a particular test provides for a particular design, the coverage indicating how well a particular test exercises a certain amount of code of the particular design.

6. The system of claim 5, wherein
the grading comprises a greedy grading operation.

7. The system of claim 5, wherein
the results of the grading are analyzed and tests which do not meet predefined criteria are removed to provide a graded group of tests.

8. The system of claim 7, wherein the system further comprises instructions executable by the processor for:
holding the graded group of tests from a respective group until each of the groups has provided respective groups of tests;
combining the tests provided by the respective groups with additional tests; and, iteratively repeating the dividing, grading, analyzing and holding.

9. A non-transitory computer-readable medium embodying computer program code, the computer program code comprising instructions executable by a processor for:
dividing a plurality of tests into groups;
grading tests within a respective group; and,
analyzing tests within the respective group upon completing grading of tests within the respective group, the analyzing being performed regardless of whether other tests in other groups have completed execution; wherein
grading tests provides a grading value, the grading value providing an indication of how well a particular test verifies a particular design; and
wherein the grading value comprises a metric that indicates how much coverage a particular test provides for a particular design, the coverage indicating how well a particular test exercises a certain amount of code of the particular design.

10. The non-transitory computer-usable medium of claim 9, wherein
the grading comprises a greedy grading operation.

11. The non-transitory computer-usable medium of claim 9, wherein
the results of the grading are analyzed and tests which do not meet predefined criteria are removed to provide a graded group of tests.

12. The non-transitory computer-usable medium of claim 11, the instructions executable by the processor further comprise instructions for:
holding the graded group of tests from a respective group until each of the groups has provided respective groups of tests;
combining the tests provided by the respective groups with additional tests; and, iteratively repeating the dividing, grading, analyzing and holding.

* * * * *